Jan. 17, 1961   N. H. HACKETT   2,968,153
HYDRAULIC BRAKE SYSTEM
Filed June 26, 1958   5 Sheets-Sheet 1

Jan. 17, 1961     N. H. HACKETT     2,968,153
HYDRAULIC BRAKE SYSTEM
Filed June 26, 1958     5 Sheets-Sheet 2

Jan. 17, 1961   N. H. HACKETT   2,968,153
HYDRAULIC BRAKE SYSTEM
Filed June 26, 1958   5 Sheets-Sheet 3

Jan. 17, 1961   N. H. HACKETT   2,968,153
HYDRAULIC BRAKE SYSTEM
Filed June 26, 1958   5 Sheets-Sheet 4

United States Patent Office 2,968,153
Patented Jan. 17, 1961

2,968,153

HYDRAULIC BRAKE SYSTEM

Norman Henry Hackett, Flat 4, 19 Imperial Ave., Bondi, near Sydney, New South Wales, Australia Filed June 26, 1958, Ser. No. 744,777

3 Claims. (Cl. 60—54.5)

This invention relates to hydraulic braking systems for road and other vehicles having two or more braked wheels. For descriptive convenience, the invention is discussed and described primarily in terms of its application to an ordinary motor vehicle having a four wheel hydraulic brake system.

There have been several prior proposals to provide motor cars with hydraulic brakes comprising a plurality of what may be called separate brake sub-systems applicable to various wheel combinations. For example, it has been proposed to provide one sub-system for the front wheels, and a second sub-system for the back wheels. During normal brake operation both sub-systems are operated from a single master cylinder in the same manner as in a conventional hydraulic brake system; but, in the event of failure in one sub-system, provision is made to seal the sub-system from the master cylinder while maintaining normal communication between the master cylinder and intact sub-system.

The present invention is applicable to a brake system of the kind incorporating a plurality of sub-systems as discussed above, but is distinguishable from the prior systems in several important respects.

In the prior systems it has been a matter of considerable difficulty and mechanical complexity to reset the system for normal operation following bleeding of the system after repair. Furthermore, the previous systems have, in themselves, been mechanically complex, not completely reliable in action, not readily capable of incorporation in existing conventional systems, and not well adapted for the incorporation of reliable hydraulic "hand" or parking brake means; which, in the event of slow leakage of hydraulic fluid in any part of the system, will automatically and sustainedly apply the brakes.

The object of the present invention is to remedy the foregoing problems in a simple manner.

In one form, a hydraulic brake system embodying the invention includes a master cylinder hydraulically connected to each of a plurality of sub-systems (each containing brake shoe actuating means) to concurrently operate the sub-systems upon actuation of the master cylinder. Each sub-system includes means for blocking communication between the sub-system and the master cylinder upon failure of the sub-system without interfering with communication between the master cylinder and the other sub-system. A "foot" or running brake unit for each of the sub-systems includes an operating cylinder having an outlet pipe leading from one of its ends to its related shoe actuating means and having its other end in communication with the master cylinder through a fluid inlet duct. A sealing ring in each of the operating cylinders acts as a movable pressure transmission barrier which is also operable to close communication between the master cylinder and the outlet pipe leading from the operating cylinder upon pressure loss in the outlet pipe. The sealing rings are mounted in a manner, which, without necessitating dismantling of any operative part of the entire system, enable said system to be conditioned either for bleeding and fluid replenishment or for normal brake operation.

The system defined in the preceding paragraph may also include parking brake devices comprising, a "parking" cylinder which (when the parking brake is not in use) constitutes part of the fluid inlet duct, a piston in the parking cylinder able to obstruct the duct, and spring loading means for the piston which (when the parking brake is in use) urge the piston to reduce the effective volume of the parking cylinder.

Examples of the invention are illustrated in the drawings herewith.

Fig. 1 is a diagrammatic layout of an entire brake system showing two sub-systems A and B, a running brake unit comprising a pair of operating cylinders C and D respectively connected in the sub-systems by outlet pipes E and F, a master cylinder G connected to the operating cylinders by an inlet duct which may be a direct connection, as indicated by dotted line H, or a connection by way of duct portion I which includes a parking brake unit as indicated at J.

Each of the illustrated sub-systems is associated with a pair of vehicle wheels furnished with conventional brake shoe actuating means as indicated at K. The master cylinder G, and a pedal L to operate its plunger, are also of conventional design. Where a parking brake is included, an ordinary hand lever M and linkage N is provided for actuating an operating rod O. The linkage N may include a compensating bell crank P for operation (through cable Q) of a conventional non-hydraulic brake, simultaneously with operation of the hydraulic parking brake.

In the remaining figures of the drawings:

Fig. 2 is a cross-sectional side elevation of a running brake unit, such as that marked C, D in Fig. 1, with its parts positioned as they would be in normal use.

Fig. 3 repeats Fig. 2 but with the parts in their positions for bleeding the system and replenishing it with brake fluid.

Figure 7:
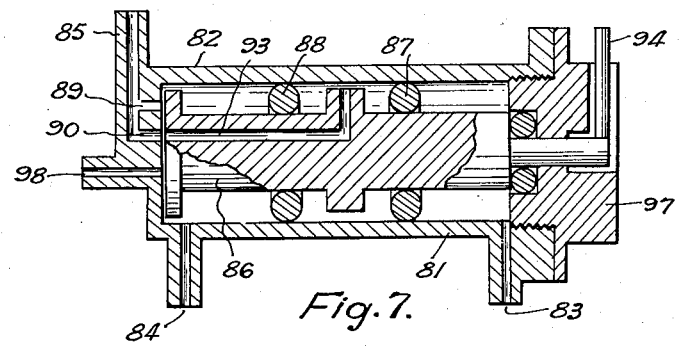
Fig. 7 is a cross-section of still another modified form of running brake unit with its parts conditioned for normal brake operation.
Figure 8:
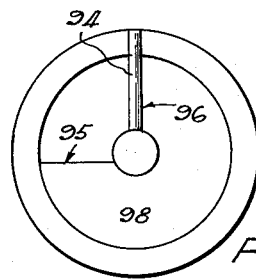
Fig. 8 is an end view of a handpiece shown at the right end of Fig. 7.
Figure 10:
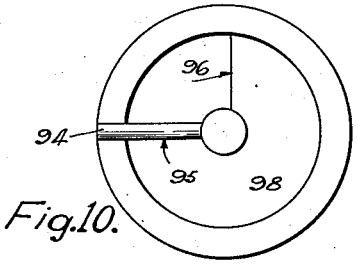
Figure 9:
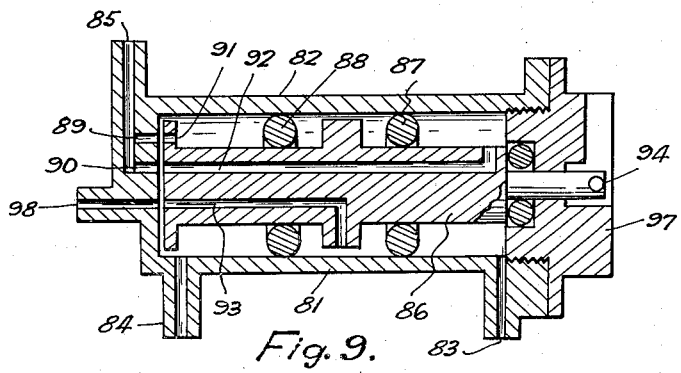

Figs. 9 and 10 of views similar to Figs. 7 and 8 respectively, but with the parts in bleeding and replenishment position.

Figure 1:
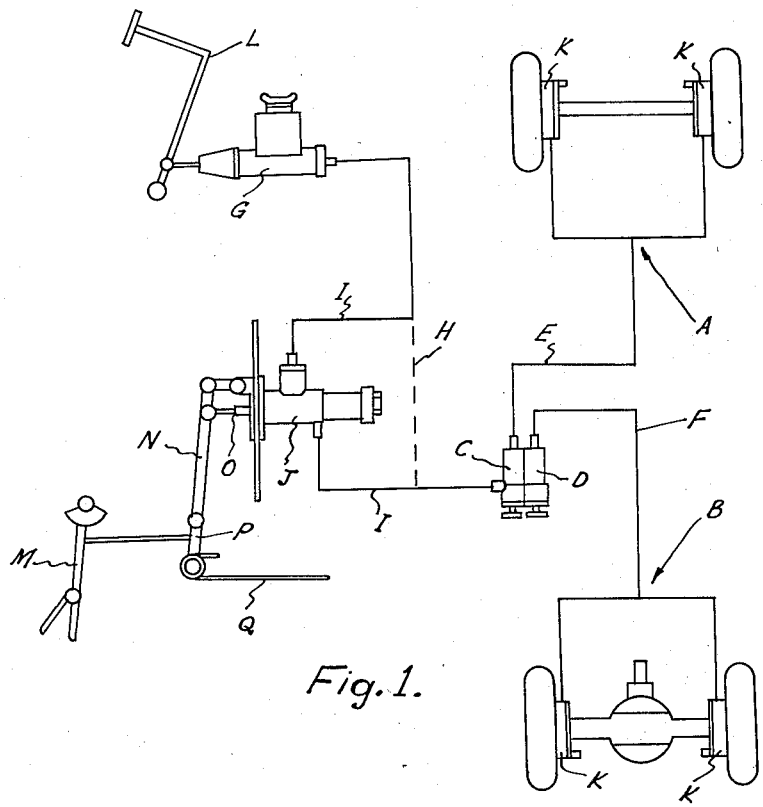
Figure 11:
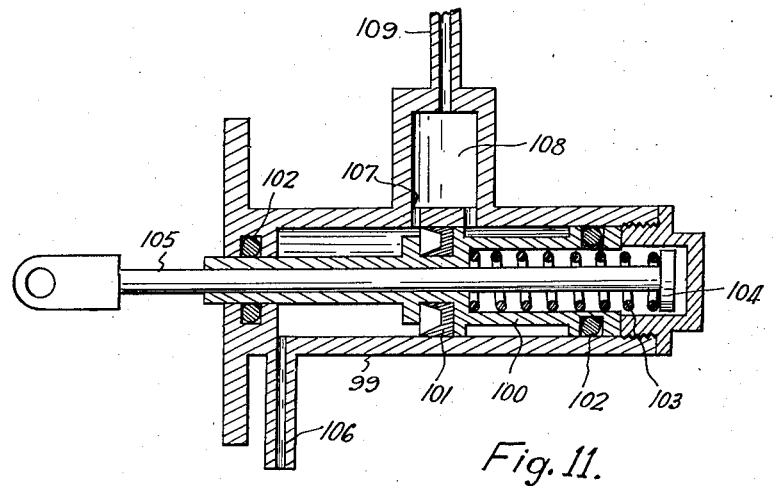

Fig. 11 is a cross-sectional side elevation of a parking brake unit such as that marked J in Fig. 1.

Figure 12:
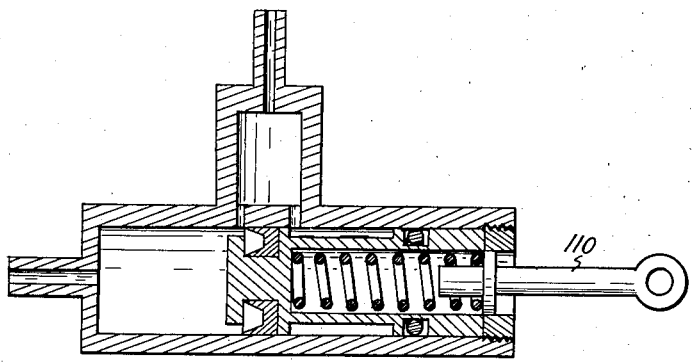
Figure 13:
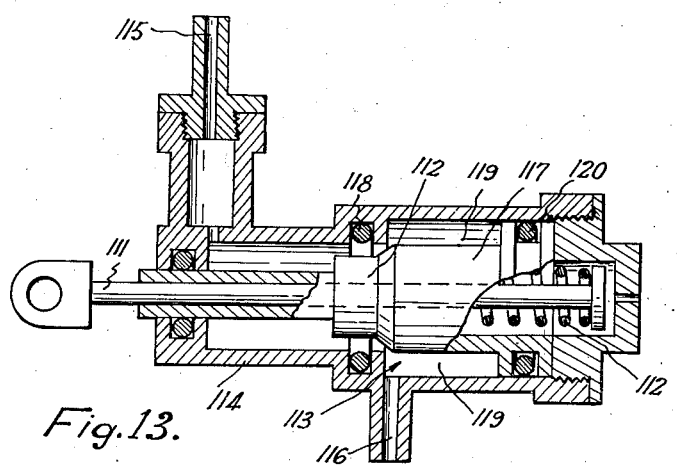
Figure 14:
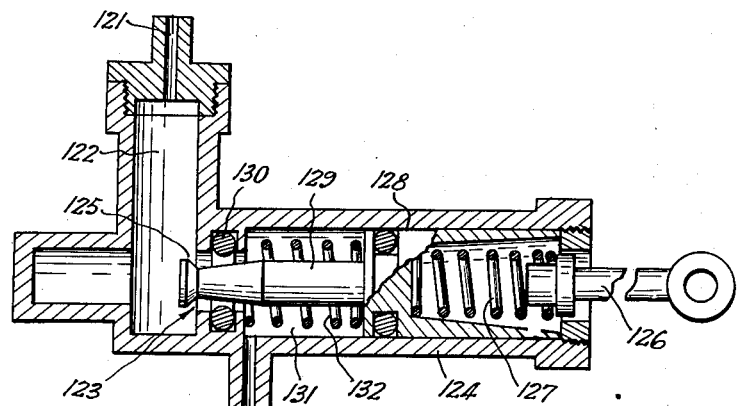

Figs. 12 to 14 are views similar to Fig. 11 showing three different modified forms of parking brake units.

Figure 15:
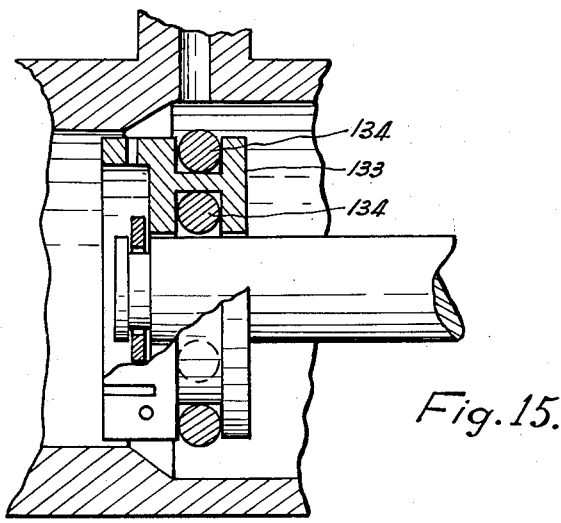
Figure 16:
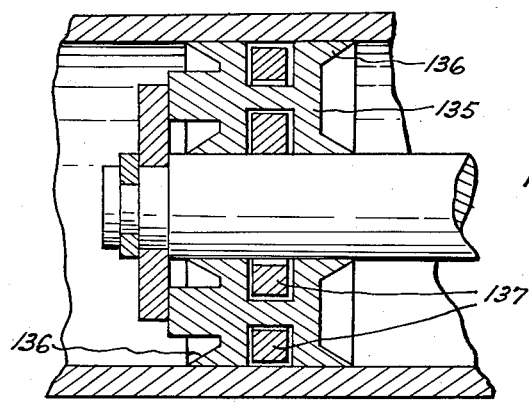

Figs. 15 and 16 are both fragmentary sectional views respectively showing two modified forms of sealing ring.

Figure 2:
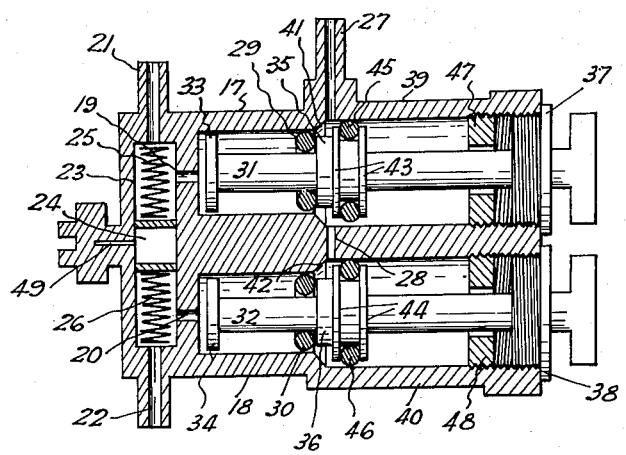
Figure 3:
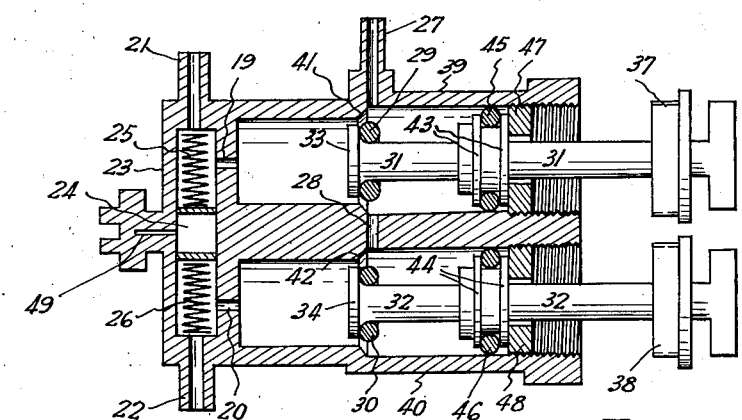

Referring to Figs. 2 and 3, each of the operating cylinders 17 and 18 is in communication at one end through ports 19 and 20, with respective outlet pipes 21 and 22 which correspond to outlet pipes E and D in Fig. 1. Ports 19 and 20 may lead directly into pipes 21 and 22, but preferably include an "alarm" cylinder 23 which houses a floating piston 24 normally biased to the middle of cylinder 23 (as shown in Fig. 2) by balanced loading springs 25 and 26 of equal strength. The purpose of alarm cylinder 23 and its loaded piston is explained in more detail below.

The other ends of the cylinders 17 and 18 communicate with a master cylinder (such as G in Fig. 1) by way of a brake fluid inlet duct 27. Cylinder 17 is connected directly to duct 27; cylinder 18 is connected to the duct through port 28.

The cylinders 17 and 18 respectively house resilient sealing rings 29 and 30 which may be of the kind commonly known as "O-rings." The rings 29 and 30 slideably seal outwardly against their cylinder walls and inwardly about "re-set" stems 31 and 32. Movement of rings 29, 30 relative to stems 31, 32 is limited by stem heads 33, 34 and stem shoulders 35, 36. The stems 31, 32 are fixed to, or slidable through, end caps 37, 38, normally screwed in the outer ends of resetting cylinders 39, 40. These cylinders are larger in diameter than the sub-system cylinders 17, 18, into which they concentrically merge by way of countersinkings 41, 42. The stems 31, 32 are preferably provided with flanges 43, 44 which act as holders for sealing rings 45, 46 and stop washers 47, 48 are screwed into the cylinders 39, 40. The nearer flanges 43, 44 can abut these washers (as shown in Fig. 3) to set one end limit on the range of axial movement of the stems 31, 32 within their respective cylinders.

During normal brake usage, with the system functioning properly, the parts of the unit shown in Fig. 2 are positioned as shown in that figure. When the running brake is applied, fluid pressure increase in the master cylinder is transmitted to the cylinder space between the rings 29, 45 and 30, 46 (as shown in Fig. 2) through the inlet duct 27; either directly by way of a pipe such as H (in Fig. 1) or through a parking brake unit (such as J in Fig. 1).

Rings 29, 30 act as pressure transmission barriers through which the necessary fluid pressure rise is transmitted to outlet pipes 21, 22 and hence to the brake shoe actuating means of the sub-systems. In this action of normal brake application the operation of the system is just the same, in effect, as that of a conventional hydraulic brake system.

When either of the sub-systems fails, through pipe breakage or otherwise, the consequent loss of pressure in that sub-system results in the master cylinder pressure moving the sealing ring (29 or 30) of the failing sub-system along its operating cylinder (17 or 18) until it is halted by the stem head (33 or 34). The sealing ring then acts as a closure valve which by blocking fluid flow to the outlet (21 or 22) isolates and closes the failing sub-system. When such a closure occurs (assuming an alarm cylinder and floating piston such as 23, 24 are present) the alarm piston 24 will move towards the outlet (21 or 22) of the failing sub-system thus to uncover a port 49 which may lead to a conventional pressure responsive switch (not shown) in the circuit of an audible or visible alarm device (not shown).

When the system is to be bled or replenished the stems 31, 32 are pulled to the positions shown in Fig. 3. Thus the rings 29, 30 are pulled out of their cylinders 17, 18 to establish direct fluid communication between the master cylinder and brake shoe actuating means. At the completion of the bleeding or refilling operation, stems 31, 32 are returned to the position shown in Fig. 2 so that the rings 29, 30 are restored to normal working position (as shown in Fig. 2) by the shoulder 35, 36; and the rings 45, 46 send the brake fluid, which during bleeding and replenishment filled the cylinders 39, 40, back to the master cylinder.

Figure 4:
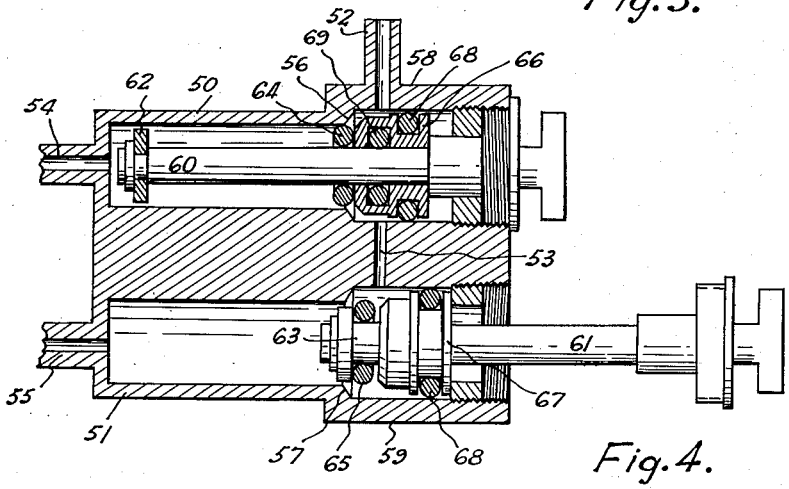
Fig. 4 is a cross-sectional side elevation of a running brake unit of modified construction with the parts in one sub-cylinder in normal working position and those of the other in bleeding and replenishment position.

In the arrangement shown in Fig. 4, the two operating cylinders 50, 51 are fed from a master cylinder through an inlet duct 52 and a port 53 and are connected to the brake actuating means by outlet pipes 54, 55. An alarm cylinder and floating piston may be associated with the outlet pipes as previously explained with reference to Figs. 2 and 3. As in the arrangement of Figs. 2 and 3, the cylinders 50, 51 end in countersinkings 56, 57 which merge into larger diameter resetting cylinders 58, 59. Stems 60, 61 have end heads 62, 63 and carry sealing rings 64, 65 which normally constitute a movable pressure transmission barrier in the same manner as rings 29, 30 of the Fig. 2 embodiment. The main difference between the arrangement of Fig. 4 and that of Figs. 2 and 3, is that the shoulders 35, 36 and the flanges 43, 44 of Figs. 2 and 3 are fixed relative to the stems 31, 32, whereas in the Fig. 4 construction collars 66, 67 are slidably mounted on the stems 60, 61. Each collar 66, 67 has an O-ring 68 to seal against its resetting cylinder and a second O-ring 69 to seal against its stem. In Fig. 4 the upper half of the figure shows the parts in the position for normal brake usage, and the lower half with the parts in the bleeding and replenishment position. In the normal position, the rings 64, 65 operate in the same way as described with reference to the sealing rings 29, 30 in Figs. 2 and 3. When one of the stems (such as 61) is withdrawn (as shown) its head 63 withdraws its sealing ring 65 from the related sub-system cylinder 51 thus clearing that cylinder for bleeding and replenishment. By simply returning the stem, the sealing ring is put back in its cylinder by the collar 66.

Figure 5:
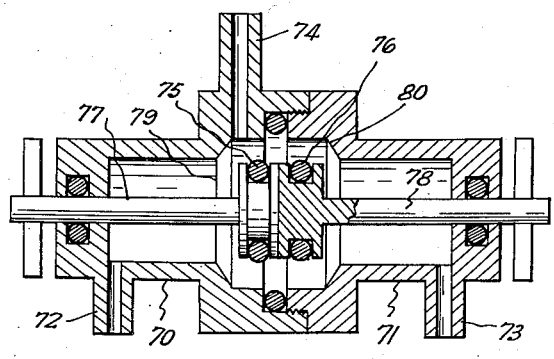
Fig. 5 is a cross-section of another modified form of running brake unit with its parts positioned for bleeding.
Figure 6:
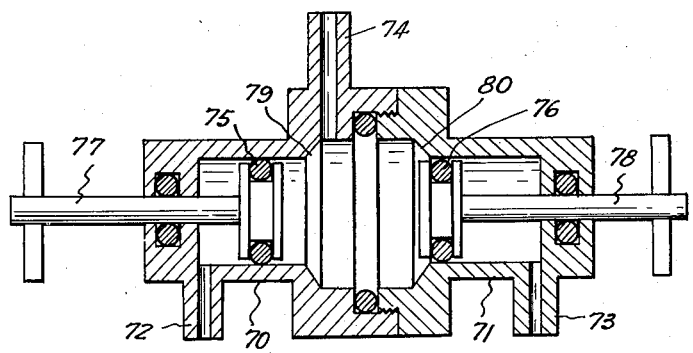
Fig. 6 is a view similar to Fig. 5 but with the parts in normal working position.

In the construction of Figs. 5 and 6, the two operating cylinders 70, 71 are disposed in axial alignment. Each has an outlet pipe 72, 73. An inlet duct 74 from a master cylinder is common to both. The sub-system sealing rings 75, 76 are in the form of pistons on stems 77, 78. When these pistons are manually pushed towards each other to the position shown in Fig. 5 the unit is conditioned for bleeding and replenishment. When the pistons are drawn apart a sufficient distance to locate rings 75, 76 in the cylinders, the unit is conditioned for normal brake use. When one of the sub-systems fails, its piston (75 or 76) moves to the outer end of its cylinder thus to close the outlet (72 or 73) of that cylinder.

In the construction shown in Figs. 7 to 10 the two operating cylinders 81, 82 are again in axial alignment, and may be made in one piece as shown. Each cylinder has an outlet 83, 84 and an inlet duct 85 from a master cylinder is common to both. A stem 86 is rotatable inside the cylinders and carries two sub-system sealing rings 87, 88 mounted on opposite sides of a central shoulder on the stem. These rings are able to close the outlets 83, 84 in the event of sub-system failure in substantially the same manner as explained above with reference to the previously described forms of the invention. The inlet duct 85 diverges into two branches 89, 90, the stem has three passages 91, 92, and 93 in it. The rotatable stem 86 is furnished with an external crank 94 which by abutment against either of two shoulders 95, 96 (Figs. 8 and 10) formed in a boss 97, is able to define opposite end limits of rotation of the stem. In one of these positions (that shown in Figs. 7 and 8) the unit is conditioned for normal brake usage. In this position the inlet duct 85 is open to the space between the rings 87, 88 by way of branch 90 and passage 93; meanwhile, branch 89 and a drain hole 98 are closed by the adjacent end face of the stem, and the passages 91, 92 are closed (at one end) by the end wall of cylinder 82.

In the position of stem 86 shown in Figs. 9 and 10 the unit is conditioned for bleeding and replenishment. In this position the several passages, branches, and the drain hole 98, line up as shown, so that the inlet duct 85 is in communication with the outlet 84 through branch 89 and passage 91; the inlet duct also communicates with the outlet 83 through branch 90 and passage 92. The space between the rings 87, 88 is vented through passage 93 and drain hole 98.

Figs. 11 to 14 show four parking brake units any one of which may be inserted in the brake fluid inlet duct of any one of the running brake units described above with reference to Figs. 2 to 10.

The unit shown in Fig. 11 comprises a parking cylinder 99 having a piston 100 slideably mounted within the cylinder. Piston 100 is provided with a conventional packing ring 101 and is sealed relative to its cylinder in any suitable manner, as by the provision of O-rings 102. Piston 100 has a cupped end within which is seated one end of a compression spring 103 which opposite end bears against the head 104 of an operating rod 105. Cylinder 99 has an outlet 106, which is connected to the inlet duct of the running brake unit to be used therewith, and has a top port 107 which opens into an auxiliary fluid chamber 108. This auxiliary chamber is connected by a conduit 109 to the master cylinder.

When the parking brake is not in use (as shown in Fig. 11) master cylinder pressure is transmitted (when a running brake application is made) straight through the parking brake unit by way of conduit 109, port 107, cylinder 99, and outlet 106.

When a parking brake application is made, the rod 105 is pulled so that spring 103 is compressed. This causes piston 100 to move to the left (in Fig. 11) so that the packing 101 moves to the left of port 107, and the piston then establishes the fluid pressure in outlet 106 necessary for actuating the brake shoes in the subsystems. If a brake failure occurs in either of the subsystems they will operate to isolate the failing sub-system as previously explained. In the event of brake fluid leakage, spring 103 biases piston 100 to the left to maintain a braking effect.

The unit shown in Fig. 12 is substantially the same as that shown in Fig. 11 except that its operating rod 110 is a push rod as distinct from the pull rod 105 of Fig. 11.

The unit of Fig. 13 is again similar to that of Fig. 11 in having a pull rod 111 which acts through a spring 112 in a cupped piston 113. Piston 113 works inside cylinder 114 which has an inlet 115 from a master cylinder and an outlet 116 which leads to a running brake unit. When this parking brake is applied, pull on the rod 111 compresses spring 112 thus moving the piston 113 to the left (in Fig. 13). This causes an enlarged diameter portion 117 of piston 113 to squeeze into a sealing ring 118 so to isolate the master cylinder. Parking brake pressure then continues by virtue of the spring applying its loading effect to the fluid in the cylinder space 119 aided by an additional sealing ring 120.

The unit of Fig. 14 is the same in principle as those of Figs. 11 to 13. Its straight through passage for running brake operation is by way of master cylinder inlet 121, chamber 122, neck opening 123, cylinder 124, and an outlet 125 which leads to the running brake unit. When the parking brake is applied, push on the operating rod 126 loads the spring 127 thus urging piston 128 to the left (in Fig. 14). This causes a mast 129 on and forming part of the piston to squeeze into sealing ring 130 so isolating the master cylinder. Braking pressure then continues due to spring 127 exerting its load on the fluid trapped in the cylinder space 131. A compression spring 132 may be housed in space 131 to assist return movement of piston 128 when the parking brake is released.

The sealing ring shown in Fig. 15 acts in the same way as the others described herein (for instance, ring 29 in Fig. 2), but instead of being a unitary ring it consists of a grooved metal collar 133 having O-rings 134 in the grooves. The sealing ring in Fig. 16 also acts in the same way; and consists of rubber collar 135 with seal lips 136. Collar 135 may have two metal stiffening rings 137 moulded, or inserted in grooves, therein.

I claim:
1. For use in a hydraulic brake system having a master cylinder and a pair of brake actuating cylinders; a safety device comprising a housing having a pair of parallel bores therein, each of said bores having an enlarged diameter section defining a resetting chamber and a coaxial smaller diameter section extending from one end of said resetting chamber to define an operating chamber, inlet conduit means hydraulically connecting said master cylinder to the resetting chamber of each bore adjacent the operating chamber, outlet conduit means respectively connecting the end of each operating chamber remote from its resetting chamber to one of said pair of brake actuating cylinders, a stem extending coaxially through each of said bores for substantially the entire length of the bore, means supporting said stems in said housing for movement axially within their respective bores, means fixedly mounted on each of said stems within the respective resetting chambers to define a seal located between said inlet conduit means and the end of the resetting chamber remote from its associated operating chamber, a sealing ring mounted upon said stem for sliding sealing engagement with said stem and the wall of the associated operating chamber to define a movable pressure transmission barrier and seal between said inlet conduit means and the respective outlet conduit means, and a shoulder on each of said stems located between the sealing ring and its associated outlet conduit means, said shoulder being located upon said stem to withdraw said sealing ring from said operating chamber upon movement of said stem axially away from said outlet conduit means to place said inlet conduit means and said outlet conduit means in direct hydraulic communication with each other.

2. For use in a hydraulic brake system having a master cylinder and a pair of brake actuating cylinders; a safety device comprising a housing having an axially extending bore therein, means hydraulically sealing both ends of said bore, a stem extending coaxially through said bore and supported within said housing for rotation between a first and a second position, a central shoulder on said stem, inlet conduit means connecting said housing to said master cylinder, first conduit means in said stem communuicating within said inlet conduit means when said stem is in said first rotative position and extending through said stem to open into said bore from central shoulder, outlet conduit means connecting each end of said bore to the respective brake actuating cylinders, and a pair of sealing rings mounted upon said stem on opposite sides of said central shoulder in sliding sealing engagement with said stem and the wall of said bore to define movable pressure transmission barriers and seals between said central shoulder and the respective outlet conduits.

3. A safety device as defined in claim 2 including second conduit means within said stem operable when said stem is in said second rotative position to place said outlet conduit means in direct fluid communication with said inlet conduit means.

References Cited in the file of this patent
UNITED STATES PATENTS

| | | |
|---|---|---|
| 2,248,435 | Pleines | July 8, 1941 |
| 2,299,932 | Scott | Oct. 27, 1942 |
| 2,464,039 | Howell | Mar. 8, 1949 |
| 2,546,751 | Jackson | Mar. 27, 1951 |
| 2,741,896 | Geiger | Apr. 17, 1956 |
| 2,774,958 | Aldasoro | Dec. 18, 1956 |
| 2,844,159 | Trethewey | July 22, 1958 |
| 2,847,023 | Hansen et al. | Aug. 12, 1958 |
| 2,893,206 | Gelb | July 7, 1959 |